United States Patent
Conner et al.

(10) Patent No.: US 9,047,417 B2
(45) Date of Patent: Jun. 2, 2015

(54) NUMA AWARE NETWORK INTERFACE

(71) Applicant: Intel Corporation, Santa Clara, CA (US)

(72) Inventors: Patrick Conner, Beaverton, OR (US); Chris Pavlas, Hillsboro, OR (US); Elizabeth M. Kappler, Hillsboro, OR (US); Matthew A. Jared, Hillsboro, OR (US); Duke C. Hong, Hillsboro, OR (US); Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 13/663,131

(22) Filed: Oct. 29, 2012

(65) Prior Publication Data
US 2014/0122634 A1 May 1, 2014

(51) Int. Cl.
*H04L 12/54* (2013.01)
*G06F 13/40* (2006.01)
(Continued)

(52) U.S. Cl.
CPC ............ *G06F 13/4027* (2013.01); *H04L 41/08* (2013.01); *H04L 67/10* (2013.01); *H04L 47/10* (2013.01); *H04L 12/56* (2013.01); *H04L 47/33* (2013.01)

(58) Field of Classification Search
CPC ......... H04L 12/56; H04L 41/08; H04L 47/10; H04L 47/33; H04L 67/10
USPC .......................... 709/203, 217, 223–226, 229; 370/216–218, 229, 232, 238, 254, 351
See application file for complete search history.

(56) References Cited

U.S. PATENT DOCUMENTS 3,749,845 A 7/1973 Fraser
5,243,699 A 9/1993 Nickolls et al.
(Continued)

FOREIGN PATENT DOCUMENTS

EP 1367799 B1 12/2003
WO 2006055494 A1 5/2006

OTHER PUBLICATIONS

Microsoft Corporation, "Scalable Networking: Eliminating the Receive Processing Bottleneck—Introducing RSS", WinHEC 2004 Version, Apr. 14, 2004, pp. 1-17.
(Continued)

*Primary Examiner* — Lashonda Jacobs
(74) *Attorney, Agent, or Firm* — Law Office of R. Alan Burnett, P.S.

(57) ABSTRACT

Methods, apparatus, and computer platforms and architectures employing node aware network interfaces are disclosed. The methods and apparatus may be implemented on computer platforms such as those employing a Non-uniform Memory Access (NUMA) architecture including a plurality of nodes, each node comprising a plurality of components including a processor having at least one level of memory cache and being operatively coupled to system memory and operatively coupled to a NUMA aware Network Interface Controller (NIC). Under one method, a packet is received from a network at a first NIC comprising a component of a first node, and a determination is made that packet data for the packet is to be forwarded to a second node including a second NIC. The packet data is then forwarded from the first NIC to the second NIC via a NIC-to-NIC interconnect link. Upon being received at the second NIC, processing of the packet (data) is handled as if the packet was received from the network at the second NIC.

30 Claims, 9 Drawing Sheets

(51) Int. Cl.
*H04L 12/24* (2006.01)
*H04L 29/08* (2006.01)
*H04L 12/801* (2013.01)

(56) References Cited

U.S. PATENT DOCUMENTS

| | | | |
|---|---|---|---|
| 5,296,935 A | 3/1994 | Bresler | |
| 5,398,245 A | 3/1995 | Harriman, Jr. | |
| 5,781,549 A | 7/1998 | Dai | |
| 5,937,169 A | 8/1999 | Connery et al. | |
| 6,021,263 A | 2/2000 | Kujoory et al. | |
| 6,246,683 B1 | 6/2001 | Connery et al. | |
| 6,247,060 B1 | 6/2001 | Boucher et al. | |
| 6,295,280 B1 * | 9/2001 | Oh | 370/254 |
| 6,308,282 B1 * | 10/2001 | Huang et al. | 714/4.3 |
| 6,389,468 B1 | 5/2002 | Muller et al. | |
| 6,453,360 B1 | 9/2002 | Muller et al. | |
| 6,483,804 B1 | 11/2002 | Muller et al. | |
| 6,484,209 B1 | 11/2002 | Momirov | |
| 6,564,267 B1 | 5/2003 | Lindsay | |
| 6,618,793 B2 | 9/2003 | Rozario et al. | |
| 6,625,689 B2 | 9/2003 | Narad et al. | |
| 6,633,576 B1 | 10/2003 | Melaragni et al. | |
| 6,633,835 B1 | 10/2003 | Moran et al. | |
| 6,650,640 B1 | 11/2003 | Muller et al. | |
| 6,658,480 B2 | 12/2003 | Boucher et al. | |
| 6,662,276 B2 * | 12/2003 | Schoinas | 711/145 |
| 6,665,495 B1 | 12/2003 | Miles et al. | |
| 6,665,755 B2 | 12/2003 | Modelski et al. | |
| 6,683,873 B1 | 1/2004 | Kwok et al. | |
| 6,687,905 B1 | 2/2004 | Day et al. | |
| 6,708,292 B1 | 3/2004 | Mangasarian | |
| 6,715,005 B1 | 3/2004 | Rodriguez et al. | |
| 6,718,326 B2 | 4/2004 | Uga et al. | |
| 6,728,265 B1 | 4/2004 | Yavatkar et al. | |
| 6,804,241 B2 | 10/2004 | Schwartz et al. | |
| 6,816,455 B2 | 11/2004 | Goldberg et al. | |
| 6,934,296 B2 | 8/2005 | Shimojo | |
| 6,956,853 B1 | 10/2005 | Connery et al. | |
| 6,957,281 B2 | 10/2005 | Mann et al. | |
| 6,968,358 B2 | 11/2005 | Freimuth et al. | |
| 6,973,040 B1 | 12/2005 | Ricciulli | |
| 6,981,074 B2 | 12/2005 | Oner et al. | |
| 7,012,919 B1 | 3/2006 | So et al. | |
| 7,039,061 B2 | 5/2006 | Connor et al. | |
| 7,043,494 B1 | 5/2006 | Joshi et al. | |
| 7,080,308 B1 | 7/2006 | Schroeder | |
| 7,162,740 B2 | 1/2007 | Eastlake, III | |
| 7,177,956 B2 | 2/2007 | Mann et al. | |
| 7,219,228 B2 | 5/2007 | Lin | |
| 7,404,040 B2 | 7/2008 | Ronciak et al. | |
| 7,586,925 B2 | 9/2009 | Smith et al. | |
| 7,620,046 B2 | 11/2009 | Ronciak et al. | |
| 7,639,624 B2 * | 12/2009 | McGee et al. | 370/248 |
| 7,693,045 B2 * | 4/2010 | McGee et al. | 370/216 |
| 7,936,755 B2 | 5/2011 | Mann et al. | |
| 7,944,828 B2 | 5/2011 | Ronciak et al. | |
| 8,098,676 B2 | 1/2012 | Connor | |
| 8,134,928 B1 * | 3/2012 | Manickavasagam et al. | 370/242 |
| 8,438,284 B2 * | 5/2013 | Horman et al. | 709/226 |
| 8,694,618 B2 * | 4/2014 | Mugundan et al. | 709/223 |
| 2001/0025315 A1 | 9/2001 | Jolitz | |
| 2001/0037397 A1 | 11/2001 | Boucher et al. | |
| 2001/0048681 A1 | 12/2001 | Bilic et al. | |
| 2002/0057651 A1 | 5/2002 | Roberts | |
| 2002/0073216 A1 | 6/2002 | Gaur | |
| 2002/0110136 A1 | 8/2002 | Wakai et al. | |
| 2002/0126711 A1 | 9/2002 | Robinett et al. | |
| 2002/0144004 A1 | 10/2002 | Gaur et al. | |
| 2002/0147851 A1 | 10/2002 | Morimura et al. | |
| 2002/0181506 A1 | 12/2002 | Loguinov | |
| 2003/0007469 A1 | 1/2003 | Daley et al. | |
| 2003/0043810 A1 | 3/2003 | Boduch et al. | |
| 2003/0065889 A1 | 4/2003 | Kamitani et al. | |
| 2003/0093645 A1 | 5/2003 | Wong et al. | |
| 2003/0095559 A1 | 5/2003 | Sano et al. | |
| 2003/0108044 A1 | 6/2003 | Hendel | |
| 2003/0126233 A1 | 7/2003 | Bryers et al. | |
| 2003/0226032 A1 | 12/2003 | Robert | |
| 2003/0227937 A1 | 12/2003 | Abrol et al. | |
| 2003/0231657 A1 | 12/2003 | Poon et al. | |
| 2003/0236815 A1 | 12/2003 | Brenner | |
| 2004/0013117 A1 | 1/2004 | Hendel et al. | |
| 2004/0030757 A1 | 2/2004 | Pandya | |
| 2004/0032829 A1 | 2/2004 | Bonn | |
| 2004/0062245 A1 | 4/2004 | Sharp et al. | |
| 2004/0090988 A1 | 5/2004 | Masputra et al. | |
| 2004/0100952 A1 | 5/2004 | Boucher et al. | |
| 2004/0151176 A1 | 8/2004 | Burton et al. | |
| 2004/0151177 A1 | 8/2004 | Burton et al. | |
| 2004/0208174 A1 | 10/2004 | Burton et al. | |
| 2004/0213284 A1 | 10/2004 | Clarke et al. | |
| 2005/0060445 A1 | 3/2005 | Beukema et al. | |
| 2005/0204058 A1 | 9/2005 | Philbrick et al. | |
| 2005/0249228 A1 | 11/2005 | Cornett | |
| 2006/0004933 A1 | 1/2006 | Sen et al. | |
| 2006/0031474 A1 | 2/2006 | Cornett | |
| 2006/0064508 A1 | 3/2006 | Panwar et al. | |
| 2006/0104303 A1 | 5/2006 | Makineni et al. | |
| 2006/0206489 A1 * | 9/2006 | Finnie et al. | 707/10 |
| 2007/0064737 A1 | 3/2007 | Williams | |
| 2009/0028152 A1 | 1/2009 | Shimonishi | |
| 2009/0154459 A1 | 6/2009 | Husak et al. | |
| 2010/0020818 A1 * | 1/2010 | Cardona et al. | 370/463 |
| 2010/0217949 A1 * | 8/2010 | Schopp et al. | 711/173 |
| 2011/0131328 A1 * | 6/2011 | Horman et al. | 709/226 |
| 2011/0208871 A1 | 8/2011 | Mann et al. | |
| 2011/0208874 A1 | 8/2011 | Mann et al. | |
| 2012/0072624 A1 * | 3/2012 | Droux et al. | 710/39 |
| 2012/0243550 A1 | 9/2012 | Connor | |
| 2012/0265801 A1 * | 10/2012 | Mugundan et al. | 709/203 |
| 2013/0055270 A1 * | 2/2013 | Dabagh et al. | 718/102 |
| 2014/0029617 A1 * | 1/2014 | Wang et al. | 370/392 |

OTHER PUBLICATIONS

Information Sciences Institute, "Transmission Control Protocol: DARPA Internet Program Protocol Specification", RFC:793, Sep. 1981, 92 pages.

EEE, "Amendment to Carrier Sense Multiple Access with Collision Detection (CSMA/CD) Access Method and Physical Layer Specifications—Aggregation of Multiple Link Segments", Mar. 30, 2000, IEEE Std 802.3ad-2000, ISBN 0-7381-2472-9, 183 pages.

RSS 2.0 at Harvard Law, "RSS 2.0 Specification", Jul. 15, 2003, 10 pages.

International Preliminary Report on Patentability Received for PCT Patent Application No. PCT/US2005/044771, mailed Jun. 28, 2007, 8 pages.

Steenbergen: Understanding Modern Denial of Service 2001, 10 pages.

Reutsche: The Architecture of a Gb/s Multimedia Protocol Adapter, Computer Communication Review ACM SIGCOMM, vol. 23, No. 3, Jul. 1993, pp. 59-68.

Intel IXP2400 Network Processor hardware Reference Manual, Nov. 2003, 229 pages.

Daemons, "Project Neptune", Phrack Magazine, vol. 7, Issue 48, file 13 of 18, Jul. 1996, 13 pages.

Jonathan Lemon, "Resisting SYN Flood DoS Attacks with a SYN Cache", FreeBSD Project, 9 pages.

International Preliminary Report on Patentability for PCT Patent Application No. PCT/US2005/041195, Mailed on May 31, 2007, 6 pages.

"Free BSD/Linux Kernel Cross Reference sys/netinet/tcp_syncache.c", 2001 Networks Associates Technology, Inc., pp. 1-24.

The Regents of the University of California, "Free BSD/Linux Kernel Cross Reference sys/sys/queue.h", 1991, 1993, pp. 1-9.

Minturn et al., "Addressing TCP/IP Processing Challenges Using the IA and IXP Processors", Communications Processing, Intel Technology Journal, vol. 7, Issue 4, Nov. 14, 2003, pp. 39-50.

Sapuntzakis et al., "The Case for RDMA", Cisco Systems, Dec. 2000, 12 pages.

(56) References Cited

OTHER PUBLICATIONS

Technology at Harvard Law; "RSS 2.0 Specification"; pp. 10; Jul. 15, 2003; last accessed Feb. 5, 2008: http://cyber.law.harvard.edu/rss/rss.html.
Miller & Girouard: Patch for Common Networking Error Messages; linux.kernel; Jun. 17, 2003; blog. 2 pages.
Marc: "tcp syn cache cleanup code for sc->sc_so", Aug. 24, 1999, pp. 1-6.
"Zero Copy Sockets and NFS Code for Free BSD", pp. 1-11, retrieved on Feb. 5, 2013, available at: http://people.freebsd.org/~ken/zero_copy/.
International Search Report and Written Opinion for PCT Patent Application No. PCT/US2005/044771, mailed on May 8, 2006, 21 pages.
Osi Model, from Wikipedia, the free encyclopedia, retrieved on Feb. 6, 2013, 8 pages.
Janice M. Girouard, "patch for common networking error messages", Jun. 16, 2003, pp. 1-26.
"Re: [review please] tcp syn cache clean up code for sc->sc_so", Aug. 21, 1999, 1 page.
Kenneth D. Merry, "Zero Copy Sockets and NFS Code for FreeBSD", Jun. 16, 2000, pp. 1-7.
Wallace Wadge, "Achieving Gigabit Performance on Programmable Ethernet Network Interface Cards", May 29, 2001, 9 pages.
Zec et al., "Estimating the impact of interrupt Coalescing Delays on Steady State TCP Throughput", Appeared in Proceedings of the 10th SoftCOM 2002 conference, Oct. 2002, pp. 1-6.
"Intel", Interrupt Moderation Using Intel Gigabit Ethernet Controllers, Application Note (AP_450), Revision 1.1, Sep. 2003, 16 Pages, 19 Pages.
Bilic et al., "Deferred Segmentation for Wire-Speed Transmission of Large TCP Frames over Standard GbE Networks", IEEE, Aug. 22-24, 2001, pp. 81-85.
R. Braden, "Requirements for Internet Hosts—Communication Layers", Networking Group, Internet Engineering Task Force, Oct. 1989, 107 Pages.
Defense Advanced Research Projects Agency, "Transmission Control Protocol", Darpa Internet Program Protocol Specification, Sep. 1981, 87 pages.

\* cited by examiner

NUMA AWARE NETWORK INTERFACE

FIELD OF THE INVENTION

The field of invention relates generally to computer networking and, more specifically but not exclusively relates to a methods, apparatus, and computer platforms and architectures employing Non-uniform Memory Access (NUMA) aware network interfaces.

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has lead to even further usage of computer networks, and these services are forecast to become ever-more prevalent.

Expansion of network usage, particularly via cloud-based services, as been facilitated via substantial increases in network bandwidths and processor capabilities. For example, broadband network backbones typically support bandwidths of 10 Gigabits per second (Gbps) or more, while the standard for today's personal computers is a network interface designed to support a 1 Gbps Ethernet link. On the processor side, processors capabilities have been increased through both faster clock rates and use of more than one processor core. For instance, today's PCs typically employ a dual-core processor or a quad-core processor, while servers may employ processors with even more cores. For some classes of servers, it is common to employ multiple processors to enhance performance. In addition, it is envisioned that much if not most of the future processor performance increases will result from architectures employing greater numbers of cores, and that future servers may employ greater numbers of processors.

In computer systems, network access is typically facilitated through use of a Network Interface Controller (NIC), such as an Ethernet NIC. In recent years, server NICs have been designed to support for many optimizations for multi-core, multi-processor platform architectures. These optimizations include Receive Side Scaling (RSS) and Application Targeted Routing (ATR). These optimizations were designed around the prior art front-side bus (FSB) platform architecture, as illustrated in FIG. 1.

In further detail, FIG. 1 depicts a simplified front-side bus architecture diagram for a symmetric multiprocessing (SMP) platform. The architecture includes multiple processors 100 coupled to a front-side bus (FSB) 102. Also coupled to FSB 102 is a North bridge 104, which in turn is coupled to memory 106, a high-bandwidth Input/Output (I/O) interface (as depicted by a Platform Component Interconnect Express (PCIe) x8 interface 108), and a South bridge 110. South bridge 110 was typically configured to interface with various platform I/O devices and peripherals, such as depicted by PCIe x4 interfaces 112 and 114.

Under this legacy architecture the network interface controllers were attached via a PCIe interface to either North bridge 104 or South bridge 110, as depicted by NICs 116 and 118. In either case, the NICs communicated to a uniform memory 106 via North bridge 104. All processor 100 accesses to memory 106 were also via North bridge 104. Implementation of RSS and ATR distributed network workloads across cores and, although cache impacts were considered, the primary goal was workload distribution.

Processor architectures have also changed in recent years, moving from discrete components toward a highly integrated approach. For example, for many years, the North-bridge, South-bridge architecture was implemented using physically separate chips for North bridge 104 and South bridge 110 using wired (i.e., board traces) interconnects for the FSB and the interconnect between the North and South bridges. Under a typical highly integrated design employed by today's processors, a processor employing one or more processor cores and logic providing functionality somewhat similar to a North bridge and South bridge are integrated on a single chip with corresponding interconnect wiring embedded in the chip. Under this highly integrated architecture, the processor cores are referred to as the "core" and the rest of the processor circuitry is referred to as the "uncore."

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a flowchart illustrating operations and logic performed during handling of packets using the NUMA platform architectures of FIGS. 3, 4, and 4a.

DETAILED DESCRIPTION

Embodiments of methods, apparatus, and computer platforms and architectures employing Non-uniform Memory Access (NUMA) aware network interfaces are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
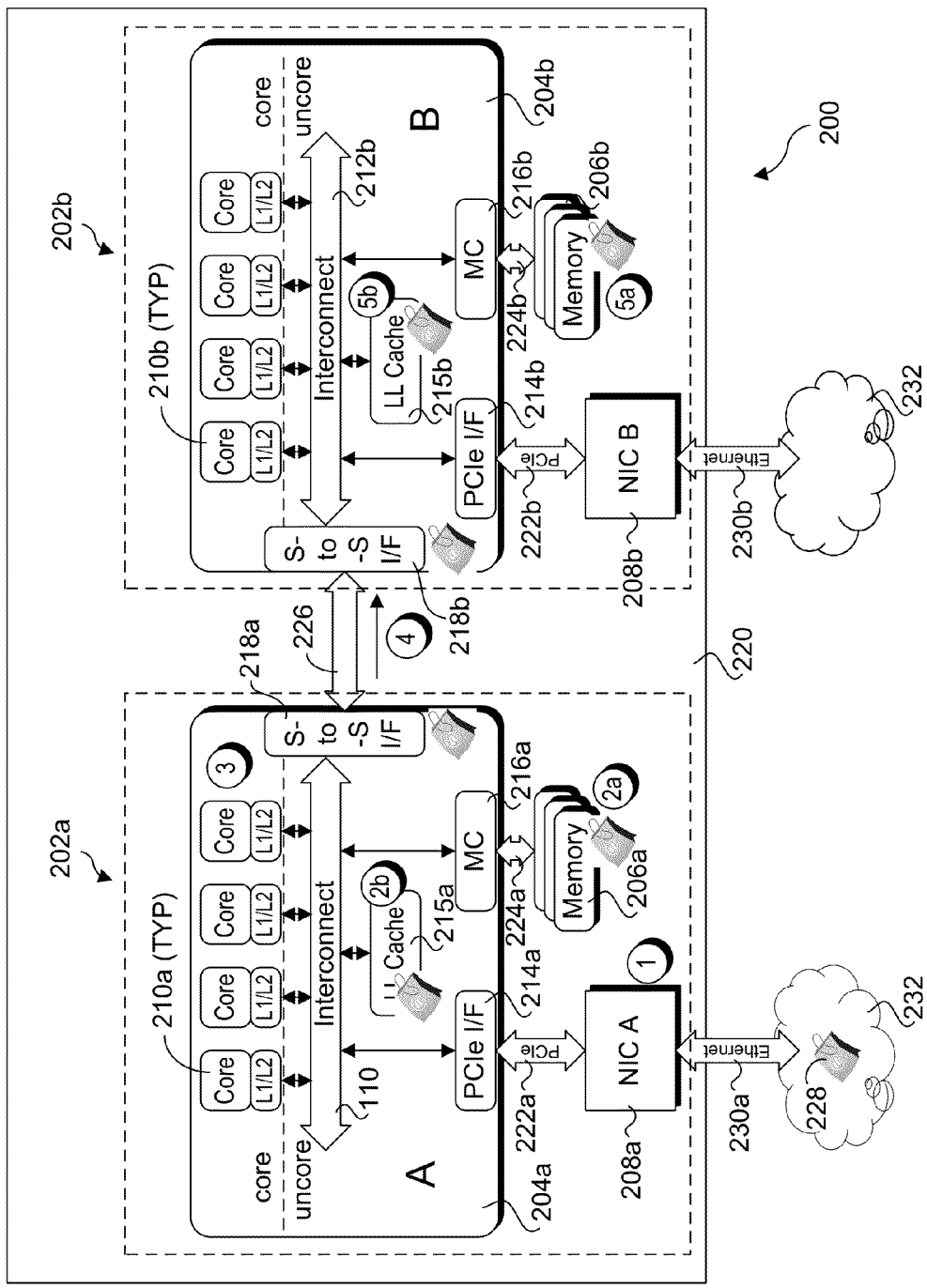
FIG. 2 is a schematic diagram of a NUMA platform architecture, further depicting processing of a packet under a conventional approach.

FIG. 2 illustrates a Non-Uniform Memory Access (NUMA) multi-processor platform architecture 200 employing two NUMA nodes 202a and 202b, also labeled 'A' and B'. For simplicity and convenience, reference to nodes herein may be to their letter label rather than their reference number. In addition, reference to a component that is common across nodes will be made to the base reference number, while a letter 'a', 'b', will be added to the reference number in the drawing Figures to identify that component on a particular node. For example, each of nodes A and B include a processor 204, which is labeled 204a for the processor for node A and 204b for the processor for node B.

In addition to a processor 204, each node includes system memory 206 and a NIC 208. Each processor 204 includes a core portion including a plurality of processor cores 210, each including a local level 1 (L1) and level 2 (L2) cache. The remaining portion of the processor is referred to as the uncore, and includes various interconnect circuitry and interfaces for connecting various functional blocks on the processor in communication. For simplicity this interconnect circuitry is depicted as an interconnect 212; however, it will be understood that interconnect 212 may be representative of one or more interconnect structures, such as buses and single or multi-lane serial point-to-point or mesh interconnect structures.

Figure 1:
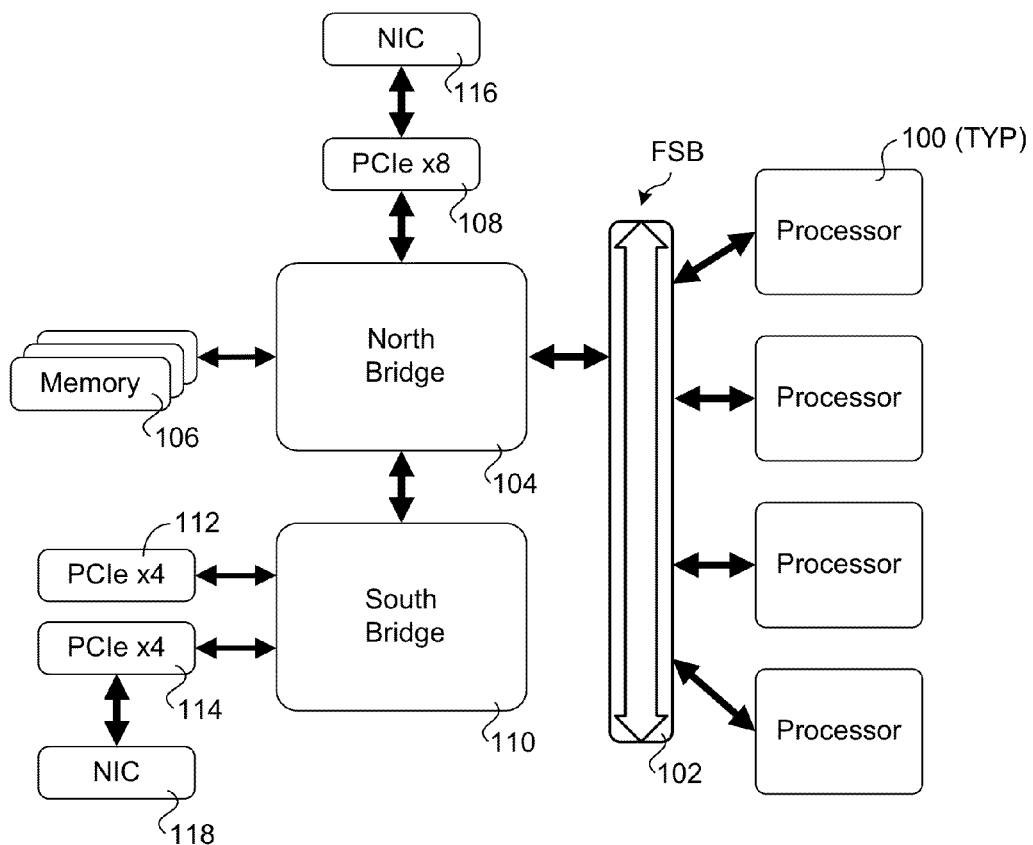
FIG. 1 is a schematic diagram of a conventional symmetric multi-processor platform architecture.

A portion of the uncore circuitry is configured to handle many of the North-bridge functions under the legacy architecture of FIG. 1, including memory control and PCIe interfaces for devices such as NICs. Corresponding exemplary functional blocks depicted in the processor uncores in FIG. 2 include a PCIe interface (I/F) 214, a last level cache (LL Cache) 215, a memory controller (MC) 216, and a socket-to-socket link interface (S-to-S I/F) 218. In addition to these illustrated blocks, each processor 204 would include many other functional blocks that are not shown for clarity.

Each of processors 204 is operatively coupled to a printed circuit board called main board 220 via a socket, or otherwise coupled to the main board via a direct coupling technique, such as flip-chip bonding. In either case, it is common practice to refer to the processors themselves as sockets, and thus the usage of the terminology socket-to-socket links and interfaces for coupling processor nodes in communication. Main board 220 includes electrical wiring (i.e., traces and vias) to facilitate electrical connections corresponding to the physical structure of various interconnects depicted in FIG. 2. These interconnects include PCIe interconnects 222 between PCIe interfaces 214 and NICs 208, interconnects 224 between memory controllers 216 and system memory 206, and a socket-to-socket link 226 coupled between socket-to-socket interfaces 218a and 218b. In one embodiment, socket-to-socket interfaces 218a and 218b employ the Intel Quickpath Interconnect (QPI)® protocol and wiring structure.

Under a NUMA architecture, processors (and processor cores) are enabled to access different memory resources distributed across the platform. The memory resources may be considered local memory resources (i.e., memory resources on the same node as a processor or core) or non-local memory resources (i.e., memory resources on other nodes). For example, under the viewpoint of node 202a, system memory 206a comprises a local memory resource, while system memory 206b comprises a non-local memory resource. Under another type of NUMA architecture (not depicted herein), non-local memory resources may also be shared between processors while not being associated with a particular processor or node. Since, for a given node, local memory resources are operatively coupled to a processor, while non-local memory resources are not, the access to the local memory resources relative to the non-local memory resources is not the same (i.e., the access is non-uniform). Moreover, it is preferable to employ local memory resources when available.

Under platform architecture 200, software running on a processor core in one node may be allocated a memory address space in system memory nominally associated with another node. Accordingly, under some embodiments the address space for a portion of the memory resources for a platform may be managed as a single global pool, with unique addresses for each memory address location within the pool. Additionally, a portion of the address space may be considered local address space that employs local addressing (e.g., address space allocated to an operating system), while another portion may be addressed using global addressing.

In accordance with another aspect of NUMA architectures, network ports (as thus associated NICs) may be assigned to software application that are running on processors (or processor cores) that are on nodes that are different than the node associated with the assigned port. When the memory allocated to the software application is on the same node as the processor, the NIC receiving the packets and the destined memory resource in which the packet data is to be written are on separate nodes.

As is well-known, NICs are configured to provide an interface with a computer network using a corresponding network protocol, such as the Ethernet protocol depicted in FIG. 2. Under a typical implementation, each NIC is associated with an operating system (OS) NIC (device) driver that is logically located in an OS kernel. The NIC driver is used as an abstracted interface between the operating system software and the NIC, which is a hardware device. For example, a NIC driver may provide access to registers on a NIC, provide a program interface to the NIC, etc. The NIC driver also facilitates handling and forwarding of data received via packets from the network to consumers of that data, such as a software application. For instance, under conventional usage packets are received at a NIC input port and buffered in an input buffer and then copied to a memory buffer in system memory that is allocated to the NIC driver by the operating system. Additionally processing of the packet data may also be performed by the NIC driver.

Under NUMA architectures, there may be instances where packets received via a computer network at a NIC on a first node needs to be written to system memory or a memory cache associated with another node, as discussed above. Such a situation is illustrated in FIG. 2, which further shows how data corresponding to a packet 228 that is received by a NIC at a first node but contains data that is to be written to system memory or cache on a second node is handled under a conventional approach. In the example illustrated in FIG. 2, each of NICs A and B are connected via respective Ethernet links 230 to a network 232. For convenience, network 232 is shown as two separate clouds; however, it will be understood that these represent connections to the same network. Optionally, the depiction of separate clouds in the Figures herein may be interpreted as identifying connections to separate networks, regardless to whether they are depicted using the same reference number.

The handling of packet 228 proceeds as follows, with corresponding operations depicted by encircled numbers in FIG. 2. First, the packet is received from network 232 via Ethernet link 230a at an input port of NIC 208a and is buffered (i.e., temporarily stored) in an input buffer. During a second operation, a packet data of packet 228 is then copied from the input buffer and written to system memory 206a using a DMA (Direct Memory Access) write operation. This involves forwarding packet data corresponding to the packet from NIC 208a via PCIe link 222a and PCIe interface 214a to memory controller 216a via interconnect 212a. Memory controller 216a then writes the packet data to system memory 206a, as depicted at an operation 2a. Optionally, the packet data is written to LL Cache 214a, as depicted by an operation 2b. The use of a DMA write operation enables the memory write to be performed independent of an operating system.

As will be understood by one skilled in the networking arts, forwarding packet data from one storage location to another is commonly termed forwarding the packet, regardless of the number of copies of the packet data that are employed. Accordingly, forwarding a packet or forwarding packet data in the detailed description and the claims includes implied data copy operations, as applicable. In addition, forwarding a packet or forwarding packet data may include transferring a portion or portions of the data in the packet, the complete packet, and/or meta-data associated with the packet such as classification results, hash values, etc.

Depending on the implementation, during a third operation a software entity running on one of cores 210a (e.g., a NIC driver) will either detect or be apprised of the arrival of packet 228 in system memory 206a or LL Cache 214a and determine that the packet data is actually associated with (i.e., the consumer of the packet is) a consumer software application having a memory allocation including a portion of the memory address space of system memory 206b on node B. Or more simply, a determination will be made that the packet data is to be written to an address within an address range associated with system memory 206b. Accordingly, during a forth operation the data for packet 228 is copied from system memory 206a or LL Cache 214a to a first buffer on socket-to-socket interface 218a on node A and sent to socket-to-socket interface 218b on node B over interconnect link 226, where it is received in a second buffer. Depending on the implementation, the buffered copy of packet 228 is either then written to system memory 206b or LL Cache 214b during a fifth operation, as depicted by operations 5a and 5b. At this stage, the packet data may be accessed by the software application that is a consumer of the packet via its location in either system memory 214b or LL Cache 214b.

The foregoing conventional approach requires the involvement of several hardware components and software entities, increasing processor overhead and interconnect traffic, resulting in additional packet transfer latency and cache pollution. These problems are addressed by embodiments of the present invention, as now discussed. Under the embodiments disclosed herein, packets received at a NIC for a first node that are destined to be written to system memory or cache corresponding to a second node are detected at the NIC of the first node and transferred to the NIC for the second node over a high-speed NIC-to-NIC interconnect between the NICs. Once the packet is received at the second NIC, it is handled as if the packet was received from the network via the second NIC to begin with. Thus, this process is transparent to other components and software entities running on both the first and second node.

Figure 3:
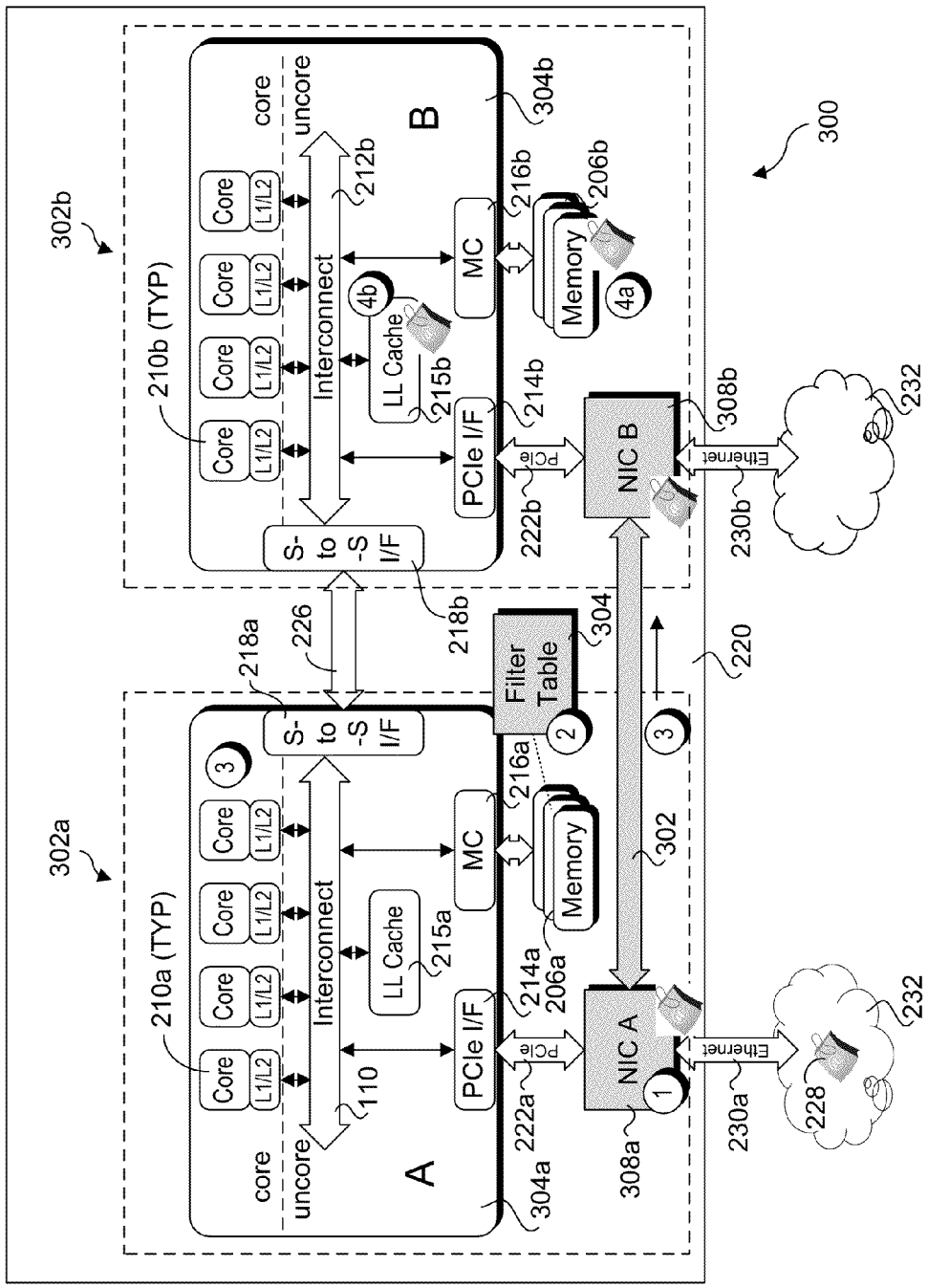
FIG. 3 is a schematic diagram of a NUMA platform architecture employing NUMA aware network interfaces, according to one embodiment.

FIG. 3 shows a NUMA multi-processor platform architecture 300 that is configured to implement the foregoing approach, according to one embodiment. Aspects of platform architecture 300 are similar to platform architecture 200, where like-numbered components perform similar operations, while augmented and new components are shown in light gray. This includes modifications to NICs 308a and 308b (NIC A and NIC B) to make them NUMA aware, as well as new components comprising a NIC-to-NIC interconnect 302 coupling NICs 308a and 308b in communication, along with a node filter table 304. FIG. 3 further shows how data corresponding to a packet 228 that is received by a NIC at a first node (A) but contains data that is to be written to a memory resource on a second node (B) is handled under NUMA platform architecture 300.

Under the FIG. 3 embodiment, handling of packet 228 proceeds as follows. As before, the packet is received at NIC 308a from network 232 via Ethernet link 230a and is buffered in an input buffer on the NIC during a first operation. During a second operation corresponding to an initial packet processing operation performed by NIC 308a, the packet header and/or packet payload for packet 228 is inspected, and applicable filter match input data is generated based on packet header field data and/or packet payload data, which is then employed by packet processing logic on NIC 308a as an input lookup against filters and/or rules defined in node filter table 304 that is maintained in system memory 206a. As detailed below, the filters and/or rules in node filter table 304 enables the node of the memory resource to which applicable packet data is to be written to be identified. In this example, the memory resource node is node B, which has a corresponding NIC 308b. Accordingly, during a third operation, data corresponding to a copy of packet 228 is forwarded from the input buffer (or another buffer) on NIC 308a to an input buffer on NIC 308b. The copy of packet 228 is then processed during a fourth operation as if it was received by NIC 308b from network 232 via Ethernet 230b, resulting in a copy of packet 228 being written using a DMA write operation to either system memory 206b (operation 4a) or LL Cache 215b (operation 4b).

The packet handling technique illustrated for NUMA platform architecture 300 enhances platform performance by eliminating the copying of the packet into system memory of the incorrect node (A) and then having to forward the packet data to its appropriate destination node (B) over the socket-to-socket interconnect 226. This reduces both the bandwidth consumption on the various interconnects that were employed under the conventional NUMA platform architecture 200, as well as packet handling operations performed by an applicable software entity or entities on the incorrect node.

Figure 4:
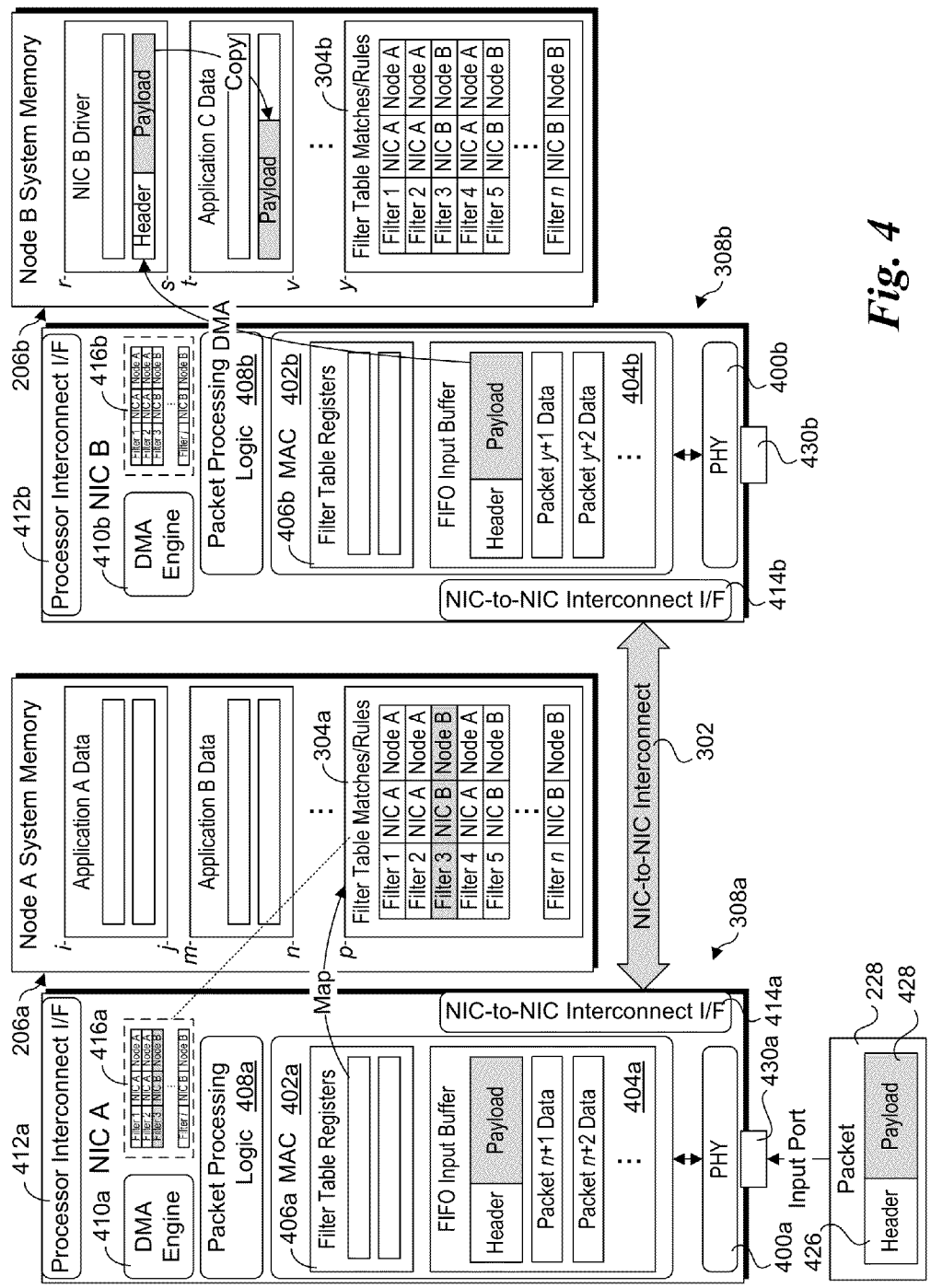
FIG. 4 is a schematic diagram illustrating further details of the NICs and Node system memories of FIG. 3, according to one embodiment.

FIG. 4 shows further details of NICs 308a and 308b and system memories 206a and 206b of NUMA platform architecture 300, according to one embodiment. Each of NICs 308a and 308b includes a Physical layer (PHY) interface 400 to which a Media Access Control (MAC) block 402 is operatively coupled. MAC block 402 includes a First-in, First-out (FIFO) input buffer 404 and filter table registers 406. Each NIC further includes packet processing logic 408, a DMA engine 410, a processor interconnect interface 412, and a NIC-to-NIC interconnect interface 414. In one embodiment, NICs 308a and 308b also include an optional node filter table cache 416.

Node A system memory 206a includes various portions of memory address space that is allocated to store corresponding data. These include a portion of memory address space allocated to software applications A and B, and a node filter table 304*a*. Similarly, node B system memory 206*b* includes memory address space allocated to a NIC B device driver, a software application C, and a node filter table 304*b*. Although not shown for clarity, a portion of the memory address space for each of system memory 206*a* and 206*b* would be allocated to one or more operating systems, and the NIC B device driver may be located in a kernel for one of the operating systems. Optionally, if virtual machines (VMs) are employed to run multiple instances of operating systems, a NIC device driver may be logically associated with a virtual machine manager (VMM) or the like. In one embodiment, one or more entries in filter table registers 406 identify the location (i.e., starting address or address range) of the node filter table 304 for the node.

Figure 4A:
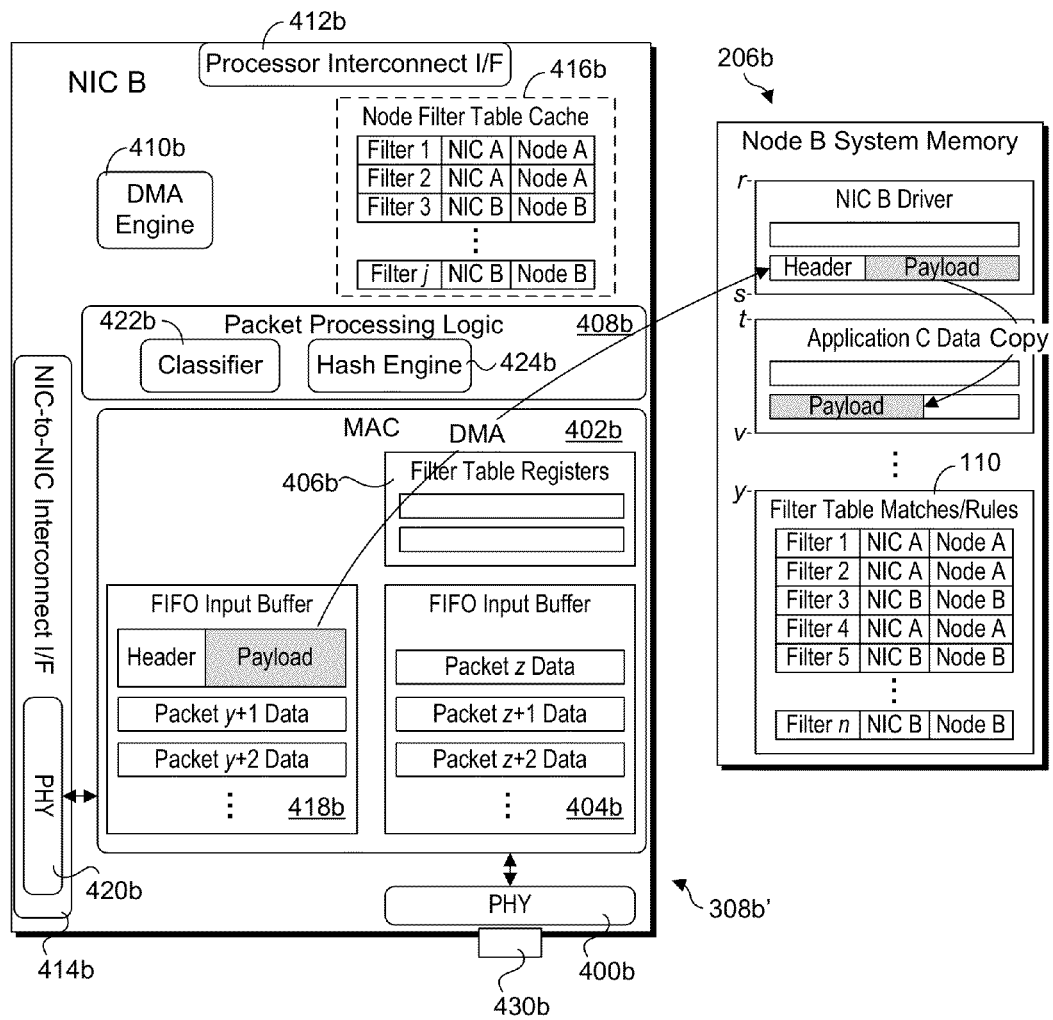
FIG. 4a is a schematic diagram illustrating further details of NIC B of FIG. 3, according to one embodiment.

FIG. 4*a* depicts a NIC 308*b*' illustrating further details of a Node 308 in FIG. 4, according to one embodiment. MAC 402*b*' is further depicted to include a second FIFO input buffer 418*b* to which a PHY 420*a* of NIC-to-NIC interconnect interface 414*a* is coupled. Packet processing logic 408*b* includes a packet classifier 422*b* and a hash engine 424*b*. In addition, FIG. 4*a* shows further details of optional node filter table cache 416*b*.

Figure 4B:
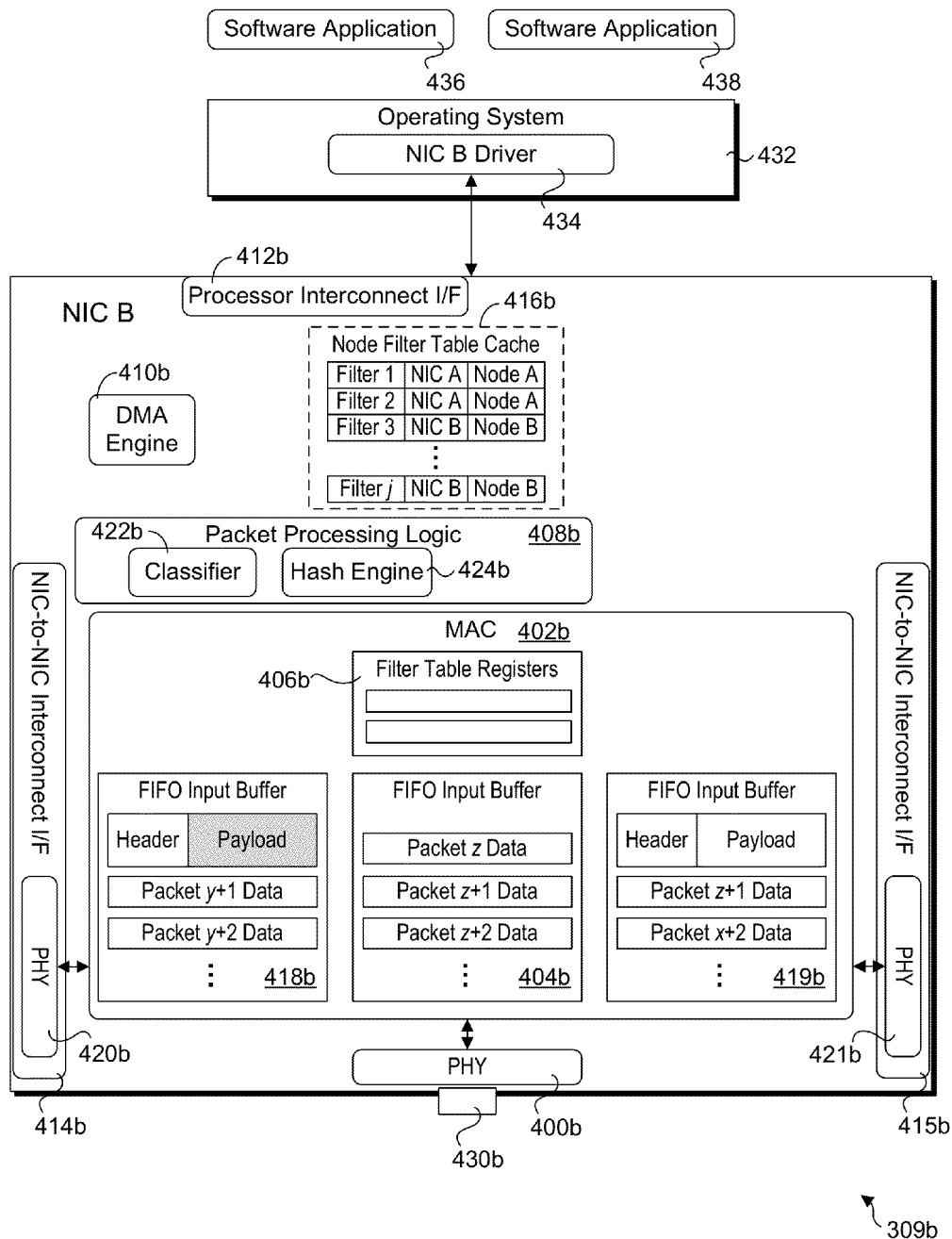
FIG. 4b is a schematic diagram illustrating one embodiment of a NUMA aware NIC employing two NIC-to-NIC interconnect interfaces.

FIG. 4*b* shows further details of a NIC 309*b*, according to one embodiment. Generally, NIC 309*b* is similar to NIC 308*b*' of FIG. 4*a*, but with the further addition of a second NIC-to-NIC interface 415*b* including a PHY 421*b* and a FIFO input buffer 419*b*. Accordingly, under this configuration each NIC-to-NIC interconnect interface is operatively coupled to a respective FIFO input buffer. Extending this approach, a NIC may have a third NIC-to-NIC interface including a PHY that is operatively coupled to a third FIFO input buffer (not shown). As an optional approach, a NIC-to-NIC interconnect interface may be multiplexed either before or after a PHY, enabling a single NIC-to-NIC interconnect interface to be shared for multiple NIC-to-NIC interconnect links.

FIG. 4*b* also depicts an operating system 432 including a NIC B driver 434, and software applications 436 and 438. Each node will typically host one or more operating system instances. One of the operating system instances may generally be employed to facilitate platform forwarding configuration information for the NICs. For example, the operating system and/or NIC driver may keep track of which NIC is allocated for sending and receiving network traffic corresponding to a software application consumer. NIC B driver 434 operates as an interface between operating system 432 and the NIC associated with the node the operating system is running on, e.g., NIC B in FIG. 4*b*. NIC driver 434 B may also be configured to update one or more of node filter table cache 416*b*, packet processing logic 408*b*, and filter table registers 406*b*.

Figure 5:
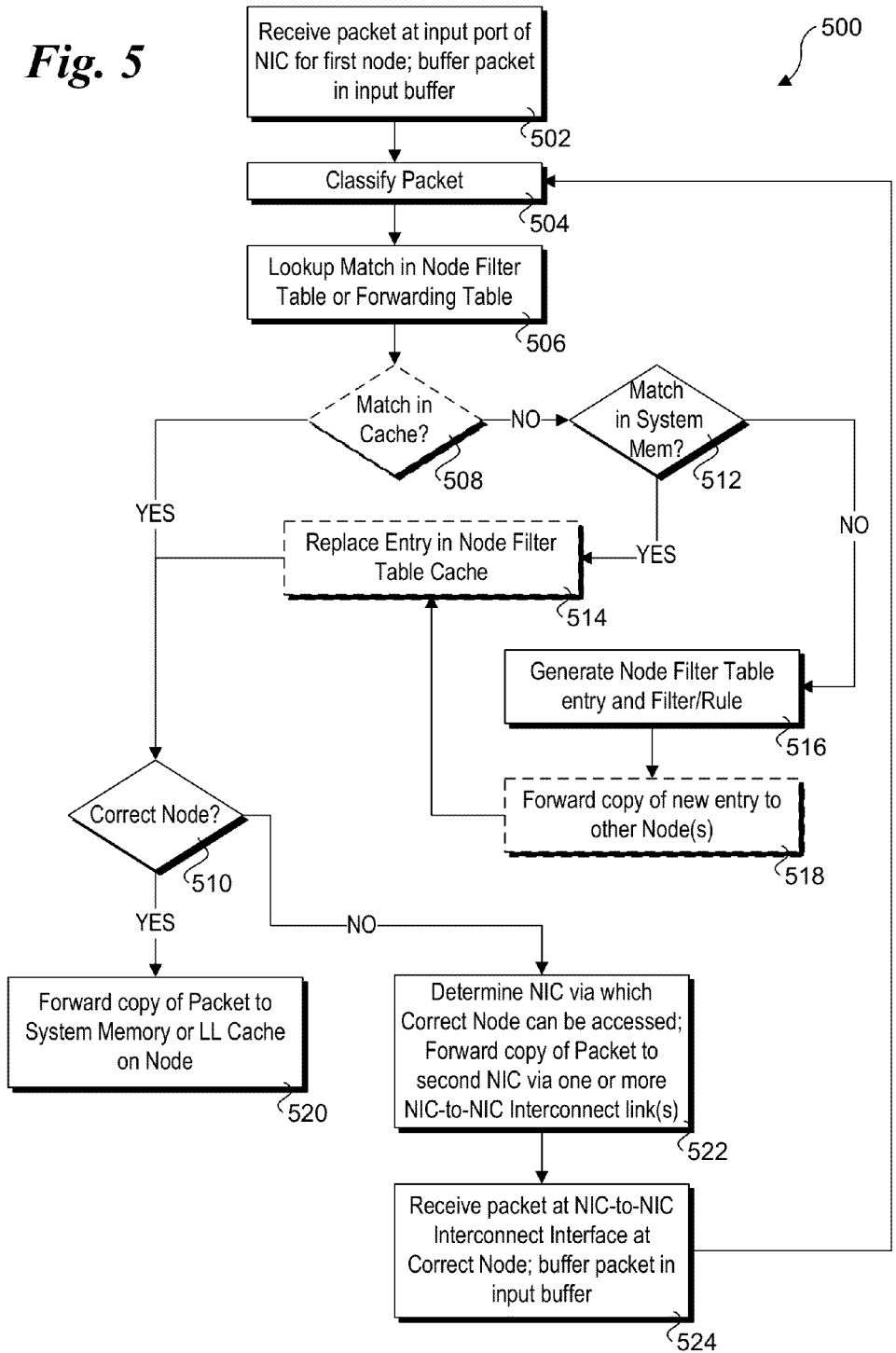

With reference to FIGS. 4, 4*a*, 4*b*, and flowchart 500 of FIG. 5, processing of a packet 228 proceeds as follows. In a block 502 of flowchart 500, packet data including a packet header 426 and payload 428 is received in the form of an analog modulated Ethernet signal at an input port 430 that is communicatively coupled to PHY 400*a* of NIC 308*a*. The PHY is used to convert the Ethernet signal via which packet data is conveyed from an analog signal to a digital data stream, and then deserialize the data stream, forwarding the deserialized digital data as blocks of data to MAC block 402. MAC block 402 performs additional processing, including detection of the start and end of packets to extract packet data that is buffered in FIFO input buffer 404*a*.

When the packet advances to the top of the FIFO queue, packet header 426 and/or packet payload 428 are inspected, and the packet is classified in a block 504 by packet classifier 422. There are various schemes well known in the art that may be used for packet classification, such as a 5-tuple classification of an Internet Protocol (IP) packet header (source address, destination address, source port, destination port, and transport protocol), or classification based on one or more header fields. As another option, data corresponding to packet payload 428 may also be considered during packet classification. Under some protocols, packet classification data may be encoded in a packet header or the packet payload. In one embodiment, packet classification is implemented by performing a hash on one or more header fields via hash engine 424. For example, in the 5-tuple example a hash may be performed on a concatenation of the 5-tuple IP field values. More generally, hash engine 424 may also be used to generate a hash value based on data in any combination of packet header fields and packet payload data.

The result of packet classification is the generation of a filter match input value (i.e., filter match input data) that is used as a lookup input to a lookup table comprising node filter table 304*a* or a packet flow table including node filter columns, as depicted in a block 506. For example, rather than employ a separate node filter table, the corresponding data for the NIC column and/or Node column could be included in a packet flow table that is used to associate packets with particular header and/or payload data to corresponding packet flows. Since flow table filters and rules are typically derived via packet classification, a conventional packet flow table could be modified to include additional columns corresponding to the illustrated NIC and Node columns.

Returning to flowchart 500, following block 506 the flowchart logic proceeds to a decision block 508, which is depicted in dashed outline to indicate this is optional. For embodiments that employ a node filter table cache, a lookup into node filter table cache 416*a* is first made to determine whether there is a matching node filter table entry. The use of a cached node filter table (or a cached packet flow table including node filter columns) may be advantageous under various server implementations. For example, it is common to classify packets associated with a client-server connection session into corresponding flows based on a combination of header field values, such as a 5-tuple hash. In cases where there is a large amount of data being transferred for a given connection, such as an upload of a file to a server, a significant portion of packets arriving at the NIC used for the connection will be classified to the same flow while the upload is being performed (since the 5-tuple values for the received packets will be the same). Thus, by caching corresponding node filter table or packet flow table entries, a match may be found in local memory on the NIC as opposed to having to perform a look up against a node filter table or forwarding table in system memory.

If a match is found in the cache as depicted by decision block 508, the flowchart logic proceeds to decision block 510. If not, the logic proceeds to a decision block 512 in which a look up against a node filter table or packet flow table in system memory (e.g., node filter table 304*a*) is performed. (Although depicted in the drawings herein in system memory for simplicity, if is possible that data corresponding to a node filter table or packet flow table may actually be accessed from a processor memory cache under some embodiments.) If a match is found, the logic proceeds to an optional block 514 in which an entry in the node filter table cache 416*a* is added. When the cache is full, each added entry requires an eviction of a current entry, which may be selected using any well-known cache eviction policy, such as least recently used (LRU), least frequency used (LFU), or FIFO, for example. The logic then proceeds to decision block 510.

If the match lookup of node filter table 304*a* (or a forwarding table including node filter table data) results in a miss, a new node filter entry including corresponding filter match value and/or rule is generated in a block 516. This process may typically be handled by a NIC driver or other entity that is employed for managing the node filter table for the node. Generally, the new entry will include a match filter or rule and identification to which node the classified flow is assigned to. Under some implementations, a connection setup and teardown feature may be employed that enables applicable packet classification information to be determined before any packets are transferred. Accordingly, under this approach a new node filter table entry or packet flow table entry may be added during the connection setup operation, rather than in response to a lookup table miss.

In one embodiment, global copies of the node filter table are maintained across all of the nodes on a platform. Optionally, copies of node filter tables may be shared among neighboring nodes. Accordingly, in an optional block 518 a copy of the new entry is forwarded to other node(s), as applicable. The new entry may also be added to node filter table cache 416*a* if this is implemented and depending on the cache replacement policy. As before, the logic then proceeds to decision block 510.

At decision block 510 a determination is made to whether the node corresponding to the NIC that receives the packet from the network (e.g., Node A in this example) is the correct node for handling the packet. More particularly, decision block 510 determines whether the memory resource to which the packet is to be written is associated with the current node handling the packet or another node. If the result is YES, the packet is handled in the conventional manner on the current node, with applicable packet data being written to an applicable destination address in system memory or LL Cache using a DMA write operation.

If the node receiving the packet is not the correct node, the logic proceeds to a block 522 in which a determination of the NIC via which the correct node can be accessed is made, followed by forwarding a copy of the packet data from the first NIC to that (second) NIC via one or more NIC-to-NIC interconnect links between the first and second NICs. In the example illustrated in FIG. 4, a copy of the packet data would be forwarded from NIC 308*a* to NIC 308*b* via NIC-to-NIC Interconnect 302. As explained in further detail below, in situations where there are more than two platform nodes, forwarding a packet from a first NIC to a second NIC may traverse more than one NIC-to-NIC interconnect link under some embodiments.

As depicted by a block 524, the packet is received at the NIC-to-NIC interconnect interface of the correct (second) node, and the packet is buffered in an input buffer. With reference to FIG. 4*a*, the packet is received and processed by PHY 420*b* and then buffered in FIFO input buffer 418*b*. As an optional implementation, the packet could be buffered in the same buffer as the packets received at an input port 430*b* for NIC 308*b'* using a multiplexing scheme that multiplexes inputs from PHY 400*b* and PHY 420*b* (not shown). In addition to the configuration shown, a NIC may have a PHY or PHYs coupled to multiple input ports, each with one or more input buffers and multiplexers (as applicable). Generally, one of these buffers could be shared with a NIC-to-NIC interconnect interface, or a separate input buffer or buffers may be used.

Once the packet is buffered in the applicable input buffer of the second NIC (e.g., FIFO input buffer 418*b*), the logic returns to block 504, and further handling of the packet proceeds as if the packet was originally received at the correct NIC to begin with. In the example illustrated in FIGS. 4 and 4*a*, the packet data is written to a memory location specified by a memory address associated with the NIC B driver via a DMA write operation facilitated by DMA engine 410*b* and then the packet payload is copied to a memory address associated with the software consumer of the packet, depicted as software application C. Optionally, the packet payload may be copied directly to an applicable memory address allocated to the software consumer application, or to an applicable address in the LL Cache for the second Node (B).

In addition to performing packet classification using a hash function or the like and then using the resulting hash value as a lookup data input against a node filter lookup table, some protocols may facilitate identification of the memory address to which a packet is to be written directly. For example, for protocols such as Fiber Channel over Ethernet (FCOE) that support Direct Data Placement (DDP), there is sufficient data in the packet for the NIC to determine the desired final destination (i.e., memory address) for the packet. Accordingly, in some embodiments a node filter lookup table may include filter and/or rule data that considers a memory address that is determined during packet processing, with corresponding table entries identifying nodes and/or NICs that packet is to be forwarded to. For example, a filter column may include address range maps to corresponding nodes and/or NICs.

Figure 6:
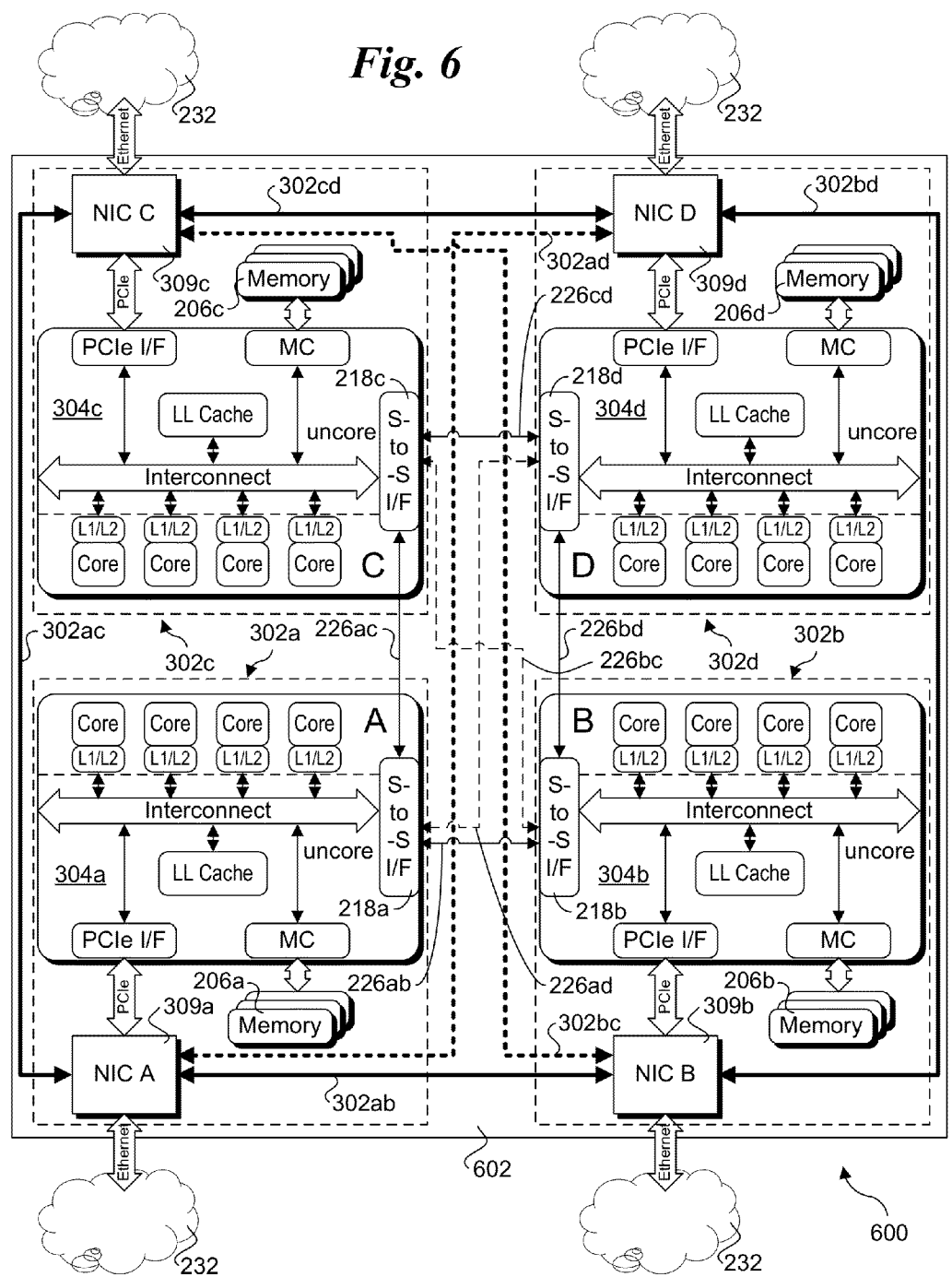
FIG. 6 is a schematic diagram of a NUMA platform architecture employing four nodes including NUMA aware network interfaces, according to one embodiment.

In general, aspects of the embodiments disclosed herein may be implemented for NUMA platform architecture employing two or more nodes. An exemplary four-node NUMA platform architecture 600 is shown in FIG. 6, including nodes 302*a*, 302*b*, 302*c*, and 302*d*, wherein each of the nodes has a similar configuration including a respective processor 304, memory 206, and NIC 309. Although the socket-to-socket interconnect interfaces 218 on processors 304*a* and 304*c* are depicted as being mirrored with mating socket-to-socket interconnect interfaces 218 on processors 304*b* and 304*d*, it will be understood that in one embodiment processors 304*a-d* have similar configurations; and the use of mirroring the interfaces in FIG. 6 is used to make the interconnect routing simpler and easier to understand. Similarly, although nodes 302*c* and 302*d* are depicted as having a mirrored configuration to nodes 302*a* and 302*b*, it will be understood that this representation is merely for illustrative purposed to make the interconnects and Ethernet connections to network 232 more direct.

In platform architecture 600, each of processors 304*a-d* is operatively coupled to a main board 602 via a respective socket (not shown) or otherwise mounted to main board 602 via an appropriate bonding scheme, such as flip-chip bounding. Optionally, the components for a given node may be mounted or otherwise operatively coupled to a daughter board, which in turn is coupled via one or more connectors to a main board. In one embodiment, main board 602 includes wiring traces to facilitate interconnects 226*xy* between pairs of socket-to-socket interfaces 318, wherein x and y correspond to the respective socket nodes for the processors being linked in communication via the interconnect. For example, interconnect 226*ac* is an interconnect between socket-to-socket interfaces 318*a* and 318*c*. In one embodiment, there are four socket-to-socket interconnects labeled 226*ac*, 226*cd*, 226*bd*, and 226*ab*. Under an optional configuration, there are additional socket-to-socket interconnects 226*ad* and 226*bc*.

As stated above, platform architecture 600 includes four NICs 309*a-d*, which are also labeled NIC A, NIC B, NIC C, and NIC D. In one embodiment, as depicted by solid connector lines, each of NICs 309*a-d* is connected to two other NICs via a NIC-to-NIC interconnect 302 nm, where m and n identify the two NICs that are interconnected. These NIC-to-NIC interconnects include interconnects 302ab, 302ac, 302cd, and 302bd. Under an optional configuration, each NIC is interconnected to the other three NICs, as depicted by additional interconnects shown with dashed lines, labeled 302ad and 302bc.

In general, the physical structure of a NIC-to-NIC interconnect may comprise one or more wired or optical pathways between a pair of NICs (forming a pathway between to NIC-to-NIC interface PHYs). In one embodiment, wired pathways are provided by wire trances in main board 602. In one embodiment employing an optical pathway, an optical cable is coupled to the NIC-to-NIC interfaces via appropriate optical connectors (not shown). As another option, a wire cable may be used for the wired pathway.

Generally, a wired NIC-to-NIC interconnect link may be implemented over a single path or multiple paths or "lanes" routed in parallel. For example, in one embodiment a PCIe link is used, such as a PCIe 1x, 2x, 4x, 8x, or 16x link, were the n in nx corresponds to the number of lanes. Other types of high-speed serial interconnects and associated protocols may also be used, including but not limited to Intel's QPI or Keizer Technology Interconnect® (KTI), or an Open Core Protocol (OCP) interconnect.

Figure 7:
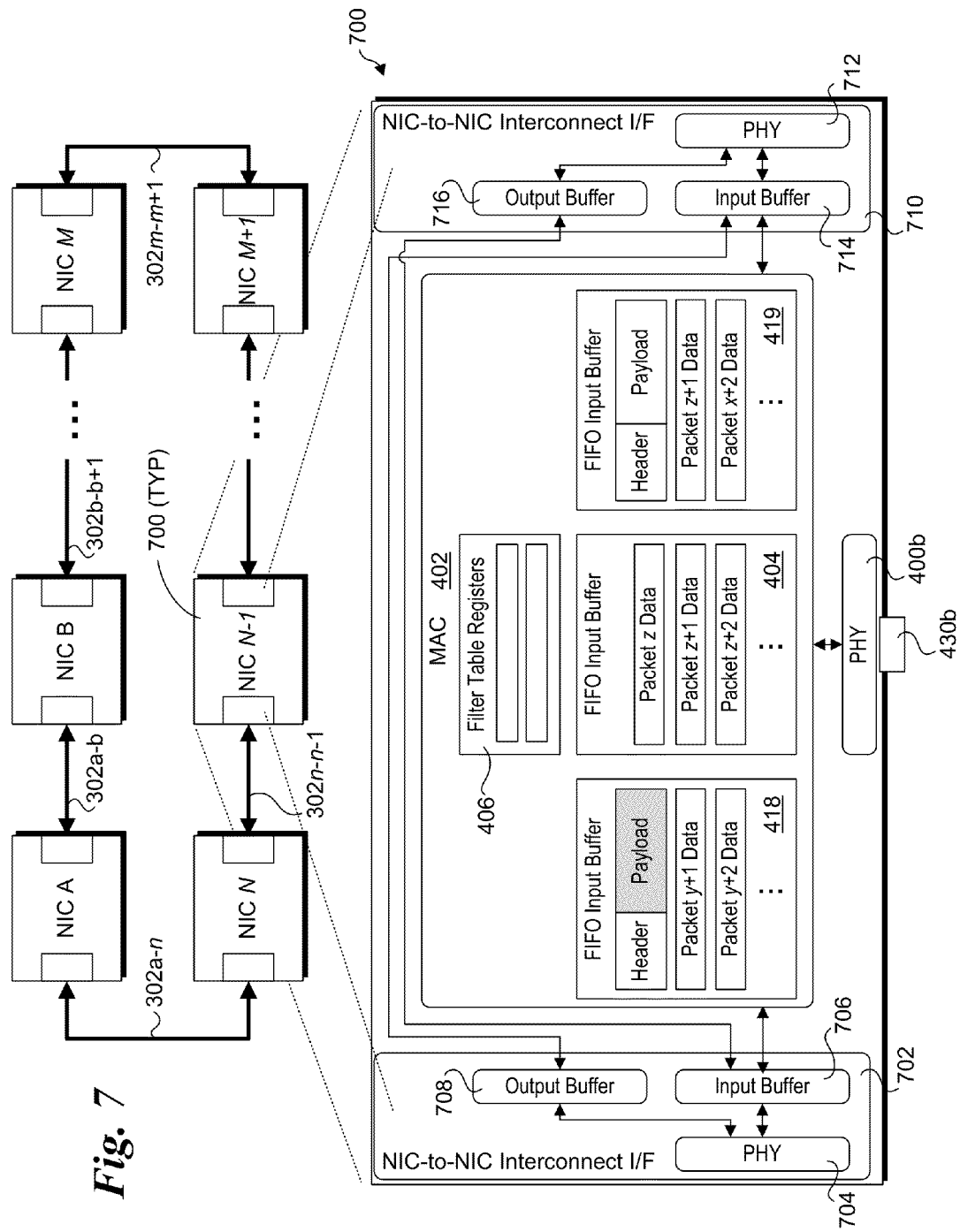
FIG. 7 is a schematic diagram illustrating a ring interconnect architecture used to interconnect multiple NUMA aware network interfaces, according to one embodiment.

In accordance with one embodiment of platform architecture 600, NICs A-D may be interconnected to form a ring-type interconnect. This approach may be extended to link larger numbers of NICs, as shown in further detail in FIG. 7, wherein the top portion of the Figure depicts a plurality of NUMA aware NICs 700 (also labeled NIC A, NIC B, etc.) interconnected via NIC-to-NIC interconnect links 302x-y. The lower portion of FIG. 7 shows details of a NIC 700, according to one embodiment. NIC 700 includes a first NIC-to-NIC interconnect interface 702 including a PHY 704 to which an input buffer 706 and an output buffer 708 is coupled. NIC 700 also includes a similarly configured NIC-to-NIC interconnect interface 710 including a PHY 712 coupled to an input buffer 714 and an output buffer 716. As further shown, input buffer 706 is connected to output buffer 716 and output buffer 708 is connected to input buffer 714.

In one embodiment, NIC-to-NIC interconnect interfaces 702 and 710 are configured to implement an interconnect protocol employing node-based addressing, where each NIC 700 represents a ring stop node on the ring interconnect. Accordingly, packet data may be forwarded between any NIC 700 to any other NIC 700 via the ring interconnect. Moreover, in one embodiment the NIC-to-NIC interconnect interfaces 702 and 710 are configured to bypass the FIFO input buffers when packet data is forwarded to a NIC 700 that is an intermediate node along a path between a forwarding NIC node and NIC node that is targeted for receiving the forwarded packet data. For example, suppose a packet is to be forwarded from NIC A to NIC N−1 via NIC N. When the packet data arrives at NIC N, logic in NIC-to-NIC interconnect interface 702 inspects the destination node address for the packet data and determines 1) that NIC N is not the destination NIC node, and 2) that the destination NIC node (NIC N−1) can be reached by forwarding the packet outbound from NIC-to-NIC interconnect interface 710. Accordingly, when the packet data is received at NIC N it is buffered in input buffer 706 and then forwarded to output buffer 716, whereupon the packet data is temporarily stored until it can be send outbound NIC-to-NIC interconnect interface 710. In this manner, packet data can be forwarded between any NIC nodes on the ring without having to be processed by packet processing logic on the intermediate NIC nodes along the forwarding portion of the ring.

In addition to a ring-type configuration, the NIC-to-NIC interconnects may be configured to support other node configuration. For example, star-type node configuration and hierarchical node configuration may be implemented with NIC-to-NIC interconnects and corresponding forwarding logic on the NICs.

The foregoing embodiment provide enhanced performance over the conventional NUMA approach under which the NICs are agnostic to being deployed in a NUMA platform architecture. Conversely, since the NICs are configured to be NUMA aware, they are enabled to forward packet data to the correct node for handling the data for situations where they are not associated with the correct node to begin with. This approach avoids additional processing operation and interconnect usage under the conventional approach, such as reducing QPI traffic employed needed for cache coherency. For Direct Data IO implementations, it also increases the effectiveness of DDIO since packet data may be directly written to the correct processor's last level cache.

While the embodiments depicted herein are referred to as NUMA architectures, the teachings and principles may be applied to other non-NUMA architectures under which forwarding of packets between NICs via NIC-to-NIC interconnects are implemented. Generally, such architectures will include multiple nodes, each including one or more processors and/or processor cores including local caches. Under some architectures, system memory may be configured such that it is accessed in a distributed manner across nodes, wherein at least a portion of the memory is not associated with a particular node. Similarly, a last level cached or the like may be configured in a distributed manner across nodes.

The NIC-to-NIC forwarding feature may be implemented in a similar manner under such non-NUMA architectures as described in the embodiments herein. Under these architectures NIC-to-NIC forwarding may be implemented such that the packet data may be accessed by the processor or processor core running the software application that is a consumer of the packet data. Accordingly, the forwarding table data is configured in consideration of the location of the processor or processor core associated with a software consumer (for a given packet).

In addition to supporting connection to networks via wired Ethernet links, embodiments of the invention may be configured to support network connections via wireless links, such as via wireless connections over an IEEE 802.11-based (aka WiFi) wireless link, a WiMAX link, or various mobile telecommunication-based data links, e.g., GSM, CDMA, GPRS, W-CDMA, EDGE, CDMA2000, UMTS, HSUPA, HSDPA, EV-DO, LTE, etc. To support a wireless network link, a NIC may be configured to process corresponding radio frequency (RF) signal data. Optionally, RF signal data processing may be implemented via a separate component or components that are communicatively coupled to a NIC.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled," "operatively coupled," and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other, while "operatively coupled" may mean that two or more elements are directly or indirectly connected when a component or device is operating.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    receiving a packet at a first Network Interface Controller (NIC) in a computer platform including a plurality of nodes, each node comprising a plurality of components including a processor being operatively coupled to system memory and operatively coupled to a NIC, the first NIC comprising a component of a first node;
    determining that the packet is to be forwarded to a second node in the computer platform including a second NIC; and
    forwarding packet data corresponding to the packet from the first NIC to a second NIC via a NIC-to-NIC interconnect link within the computer platform.

2. The method of claim 1, further comprising
    receiving packet data corresponding to the packet forwarded via the NIC-to-NIC interconnect link at the second NIC;
    buffering the packet data in an input buffer; and
    performing packet processing operations on the packet at the second NIC in a similar manner to how packet processing operations are performed on packet data corresponding to a packet that is received from a network at the second NIC.

3. The method of claim 1, wherein the operation of determining the packet is to be forwarded to the second node comprises:
    inspecting at least one of a packet header or packet payload for the packet;
    generating filter match input data as a function of data contained in at least one of the packet header or packet payload;
    using the filter match input data as an input to a lookup table to determine whether a match exists, wherein at least a portion of the entries in the lookup table contain a filter value or rule and corresponding node filter data identifying the first node or another node to which a packet having a match is to be forwarded; and
    determining that a match exists for an entry having node filter data indicating the packet is to be forwarded to the second node.

4. The method of claim 3, wherein the filter match input data is generated using a hash function.

5. The method of claim 3, wherein the filter match input data is generated in conjunction with performing packet classification, and the lookup table comprises a packet flow table.

6. The method of claim 3, wherein the packet comprises a first packet, the method further comprising:
    receiving a second packet at the first NIC;
    generating filter match input data for the second packet, the filter input data for the second packet being different than the filter match input data for the first packet;
    performing a lookup table match against the lookup table using the filter match input data for the second packet, the lookup table match resulting in a miss;
    determining at least one of a node or NIC packet data corresponding to the second packet is to be forwarded to; and generating a new entry in the lookup table including at least one of a filter or rule that would result in a match corresponding to the filter match input data for the second packet and including data identifying the node or NIC the packet data is to be forwarded to.

7. The method of claim 6, wherein the lookup table comprises a first lookup table corresponding to the first node, the method further comprising:
employing a second lookup table for the second node; and
copying the new entry in the first lookup table to the second lookup table.

8. The method of claim 3, wherein the lookup table comprises a plurality of entries, each entry comprising:
at least one of a filter ruler; and
data identifying at least of one of a node or NIC.

9. The method of claim 8, further comprising:
caching at least a portion of the entries in the lookup table in a memory cache on the first NIC; and
performing a lookup table operation against the entries in the memory cache.

10. The method of claim 1, wherein the operation of determining the packet data is to be forwarded to the second node comprises:
inspecting at least one of a packet header or packet payload for the packet;
identifying, based on the inspection, a memory address defining a memory location at which at least a portion of the packet data is to be written;
employing the memory address as a lookup input to a lookup table including a first column having at least one of a filter or rule used to match memory address lookup table inputs and a second column identifying a node or a NIC to which packet data corresponding to a packet matching the at least one filter or rule is to be forwarded; and
identifying at least one of the second NIC or second node based on a matching entry for the memory address in the lookup table.

11. The method of claim 1, further comprising:
receiving a second packet from the network at the first NIC;
determining that packet data for the second packet is to be forwarded to a third node including a third NIC; and
forwarding the packet data for the second packet from the first NIC to the third NIC via a plurality of NIC-to-NIC interconnect links.

12. The method of claim 1, wherein the first NIC-to-NIC interconnect link comprises one of a Peripheral Component Interconnect Express (PCIe) link, a Quickpath Interconnect (QPI) link, a Keizer Technology Interconnect link, or an Open Core Protocol (OCP) interconnect link.

13. The method of claim 1, wherein the computer platform is configured as a Non-uniform Memory Access (NUMA) architecture employing a plurality of NUMA nodes.

14. A network interface controller (NIC), comprising:
a first input buffer, operatively coupled to a wired or wireless interface configured to receive packets from a computer network via a network link;
a first NIC-to-NIC interconnect interface, configured to send packet data to and receive packet data from a second NIC via a first NIC-to-NIC interconnect link; and
packet processing logic, configured, upon operation of the NIC, to,
buffer a packet received via the network link in the first input buffer;
determine packet data corresponding to the packet is to be forwarded to a second node including the second NIC; and
forward the packet data corresponding to the packet to the second NIC via the first NIC-to-NIC interconnect link.

15. The NIC of claim 14, further comprising:
a second input buffer, operatively coupled to the first NIC-to-NIC interconnect interface.

16. The NIC of claim 14, further comprising:
a second NIC-to-NIC interconnect interface, configured to send packet data to and receive packet data from a third NIC via a second NIC-to-NIC interconnect link.

17. The NIC of claim 14, wherein the packet processing logic includes a packet classifier configured to classify packets based on at least one of packet header data and packet payload data for a packet.

18. The NIC of claim 17, wherein the packet processing logic includes a hash engine configured to generate a hash value as a function of at least one of packet header data and packet payload data for a packet.

19. The NIC of claim 14, wherein the packet processing logic is further configured to, upon operation of the NIC, perform operations comprising:
generating filter match input data as a function of data contained in at least one of a packet header or packet payload for a packet; and
using the filter match input data as an input to a lookup table to determine whether a match exists, wherein each of at least a portion of entries in the lookup table contain a filter value or rule and corresponding data identifying a NIC to be employed for copying at least a portion of packet data to a memory or memory cache for a packet that matches the filter value or rule for the entry.

20. The NIC of claim 19, wherein the NIC is configured to be implemented in a first node on a computer platform including a plurality of nodes, wherein each node comprises a processor having at least one level of memory cache and being operatively coupled to system memory and operatively coupled to a NIC, wherein the NIC further includes a Direct Memory Access (DMA) engine, and wherein the packet processing logic is further configured to, in response to determining a match in the lookup table exists having a corresponding entry that identifies the packet is to be handled by the first node, copying at least a portion of packet data for the packet to one of system memory for the first node or a memory cache in the processor for the first node via a DMA write operation using the DMA engine.

21. The NIC of claim 19, wherein the NIC is configured to be implemented in a first node for a computer platform including a plurality of nodes and the second NIC is configured to be implemented in a second node for the computer platform, wherein each node comprises a processor having at least one level of memory cache and being operatively coupled to system memory and operatively coupled to a NIC, and wherein the packet processing logic is further configured to, in response to determining a match in the lookup table exists having a corresponding entry that identifies the packet is to be handled by the second node, forwarding packet data corresponding to the packet from the first NIC to the second NIC via the first NIC-to-NIC interconnect link.

22. The NIC of claim 19, further comprising a memory cache configured, upon operation of the NIC, to cache at least a portion of the entries in the lookup table.

23. The NIC of claim 14, wherein the first NIC-to-NIC interconnect interface comprises one of a Peripheral Component Interconnect Express (PCIe) interface, a Quickpath Interconnect (QPI) interface, a Keizer Technology Interconnect interface, or an Open Core Protocol (OCP) interconnect interface.

24. The NIC of claim 14, wherein the first NIC-to-NIC interconnect interface is configured to facilitate communication via an optical link.

25. A computer platform, comprising:
 a main board to which components comprising a plurality of Non-uniform Memory Access (NUMA) nodes are mounted or operatively coupled, each NUMA node including a processor having at least one level of cache and being operatively coupled to system memory and a Network Interface Controller (NIC); and
 at least one NIC-to-NIC interconnect coupled between a pair of NICs.

26. The computer platform of claim 25, wherein the plurality of NUMA nodes comprises four nodes, and each NIC is coupled to at least two other NICs via NIC-to-NIC interconnects.

27. The computer platform of claim 25, wherein the plurality of NUMA nodes comprises four nodes, and each NIC is coupled to each other NIC via a NIC-to-NIC interconnect.

28. The computer platform of claim 25, wherein the at least one NIC-to-NIC interconnect comprises one of a Peripheral Component Interconnect Express (PCIe) interconnect, a Quickpath Interconnect, a Keizer Technology Interconnect, or an Open Core Protocol (OCP) interconnect.

29. The computer platform of claim 25, wherein the at least one NIC-to-NIC interconnect comprises an optical interconnect.

30. The computer platform of claim 25, wherein each of the processors is connected to at least one other processor via a socket-to-socket interconnect.

\* \* \* \* \*